United States Patent [19]
Marbrow et al.

[11] Patent Number: 5,102,734
[45] Date of Patent: Apr. 7, 1992

[54] MULTILAYER FILM

[75] Inventors: Richard A. Marbrow, Cleveland, England; David Wall, Galloway, Scotland; Michael R. Berry, Cleveland, England

[73] Assignee: Imperial Chemical Industries PLC, London, England

[21] Appl. No.: 612,708

[22] Filed: Nov. 15, 1990

[30] Foreign Application Priority Data

Nov. 15, 1989 [GB] United Kingdom ................ 8925785

[51] Int. Cl.$^5$ .................... B32B 7/12; B32B 27/08; B32B 27/36
[52] U.S. Cl. .................................. 428/349; 428/352; 428/483; 428/520
[58] Field of Search ............... 428/349, 483, 352, 520

[56] References Cited

U.S. PATENT DOCUMENTS

| | | | |
|---|---|---|---|
| 4,008,203 | 2/1977 | Jones ............................... | 524/233 X |
| 4,066,820 | 1/1978 | Kelly et al. ...................... | 428/520 X |
| 4,533,509 | 8/1985 | Gust et al. ...................... | 524/493 X |
| 4,695,503 | 9/1987 | Liu et al. ........................ | 428/349 X |
| 4,765,999 | 8/1988 | Winter ............................ | 428/349 X |
| 4,921,764 | 5/1990 | Rudd et al. ..................... | 428/349 X |
| 4,946,743 | 8/1990 | Winter ............................ | 428/349 |

FOREIGN PATENT DOCUMENTS

| | | |
|---|---|---|
| 1879 | 5/1979 | European Pat. Off. . |
| 0039225 | 11/1981 | European Pat. Off. . |
| 0150772 | 8/1985 | European Pat. Off. . |
| 184458 | 6/1986 | European Pat. Off. . |
| 0202742 | 11/1986 | European Pat. Off. . |
| 1465973 | 3/1977 | United Kingdom . |

Primary Examiner—George F. Lesmes
Assistant Examiner—D. R. Zirker
Attorney, Agent, or Firm—Cushman, Darby & Cushman

[57] ABSTRACT

A multilayer film comprises a substrate layer of polymeric material having on a first surface thereof a polyester heat-sealable layer, and on a second surface thereof a thermoset acrylic resin backing layer. The backing layer is preferably a discontinuous coating. The heat-sealable layer is optionally coated with a release layer, preferably a polyurethane resin release layer.

10 Claims, 1 Drawing Sheet

MULTILAYER FILM

This invention relates to a polymeric film, and in particular to a heat-sealable multilayer film.

It is known that polymer films often have poor handling properties which may result in difficulties in winding the films into reels and inefficient passage through processing equipment. These problems are particularly acute for transparent films which can have little or no filler material present. One way of overcoming this problem is to coat a clear base film with a thin layer of material containing a filler, which can act as an antiblocking agent, without significantly reducing the overall transparency of the composite film. U.S. Pat. No. 4,533,509 describes polyester films of this type.

Polyester film composites comprising a layer of transparent homo-polyester and a layer of transparent copolyester are described in GB Pat. No. 1,465,973. Copolyesters can be used as heat-sealable layers. Thus it is possible to produce transparent heat-sealable films by forming a thin copolyester layer containing a filler, on a non-filled polyester base layer.

However, for certain applications the presence of a slip agent in the heat-sealing layer is undesirable.

Accordingly, the present invention provides a multilayer film comprising a substrate layer of polymeric material having on a first surface thereof a polyester heat-sealable layer, and on a second surface thereof a backing layer, wherein the backing layer comprises a thermoset acrylic resin.

The invention also provides a method of producing a multilayer film by forming a substrate layer of polymeric material, applying to a first surface thereof a polyester heat-sealable layer, and applying to a second surface thereof a backing layer, wherein the backing layer comprises a thermoset acrylic resin.

The substrate of a multilayer film according to the invention may be formed from any synthetic, film-forming polymeric material. Suitable thermoplastics materials include a homopolymer or copolymer of a 1-olefine, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, eg terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, e.g. ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125°, and preferably heat set, typically at a temperature in the range 150° to 250°, for example as described in British patent 838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAR. Blends of these polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The polyester film substrate for production of a multilayer film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilized by heat-setting under dimensional restraint at a temperature above the glass transition temperature thereof.

The polyester film substrate of the present invention is desirably optically clear, preferably having a % of scattered transmitted visible light (haze) of <3.5%, and more preferably <1.5%, being measured according to the standard ASTM D 1003.

A heat-sealable layer suitably comprises a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory heat-sealable properties are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate especially a copolyester of about 82 mole % ethylene terephthalate and about 18 mole % ethylene isophthalate.

Formation of a heat-sealable layer on the substrate layer may be effected by conventional techniques - for example, by casting the polymer onto a preformed substrate layer. Conveniently, however, formation of a composite sheet (substrate and heat-sealable layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a composite sheet.

A coextruded sheet is stretched to effect molecular orientation of the substrate, and preferably heat-set. Generally, the conditions applied for stretching the substrate layer will induce partial crystallisation of the heat-sealable polymer and it is therefore preferred to heat set under dimensional restraint at a temperature selected to develop the desired morphology of the heat-sealing layer. Thus, by effecting heat-setting at a temperature below the crystalline melting temperature of the heat-sealable polymer and permitting or causing the composite to cool, the heat-sealable polymer will remain essentially crystalline. However, by heat-setting at a temperature greater than the crystalline melting temperature of the heat-sealing polymer, the latter will be rendered essentially amorphous. Heat-setting of a composite sheet comprising a polyester substrate and a copolyester heat-sealable layer is conveniently effected at a temperature within a range of from 175° to 200° C. to yield a substantially crystalline heat-sealable layer, or from 200° to 250° C. to yield an essentially amorphous heat-sealable layer. An essentially amorphous heat-sealable layer is preferred.

The thickness of the heat-sealable layer may vary over a wide range but generally will not exceed 50 μm, and is preferably within a range of from 0.5 to 25 μm, and particularly from 0.5 to 10 μm.

The backing layer of a multilayer film according to the invention comprises a film-forming acrylic resin. Suitable polymers comprise at least one monomer derived from an ester of acrylic acid, especially an alkyl ester where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred . The acrylate monomer is preferably present in a proportion in the range 30 to 65 mole %, and the methacrylate monomer is preferably present in a proportion in the range of 20 to 60 mole %.

Other monomers which are suitable for use in the preparation of the polymeric resin of the backing layer, which may be preferably copolymerised as optional additional monomers together with esters of acrylic acid and/or methacrylic acid, and derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhdyride and half esters of itaconic acid.

Other optional monomers of the backing layer polymer include vinyl esters such as vinyl acetate, vinyl chloracetate and vinyl benzoate, vinyl pyridine, vinyl chloride, vinylidene chloride. maleic acid, maleic anhydride, styrene and derivatives of styrene such as chloro styrene, hydroxy styrene and alkylated styrenes, wherein the alkyl group contains from one to ten carbon atoms.

A preferred backing layer polymer, derived from 3 monomers comprises 35 to 60 mole % of ethyl acrylate/ 30 to 55 mole % of methyl methacrylate/2–20 mole % of methacrylamide.

The molecular weight of the backing layer polymer can vary over a wide range but is preferably within the range 40,000 to 300,000, and more preferably within the range 50,000 to 200,000.

If desired, the backing layer composition may also contain a cross-linking agent which functions to cross-link the polymeric layer thereby improving adhesion to the polymeric film substrate. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, e.g. formaldehyde. A useful condensation product is that of melamine with formaldehyde. The condensation product may optionally be alkoxylated. The cross-linking agent may preferably be used in amounts of up to 25% by weight based on the weight of the polymer in the coating composition. A catalyst is also preferably employed to facilitate cross-linking action of the cross linking agent. Preferred catalysts for cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilized by reaction with a base, and morpholinium paratoluene sulphonate.

The polymer of the backing layer composition is generally water-insoluble. The coating composition including the water-insoluble polymer may nevertheless be applied to the polymeric film substrate as an aqueous dispersion or alternatively as a solution in organic solvents. The coating medium may be applied to an already oriented film substrate. However, application of the coating medium is preferably effected before or during the stretching operation.

In particular, it is preferred that the backing layer medium should be applied to the film substrate between the two stages (longitudinal and transverse) of a biaxial stretching operation. Such a sequence of stretching and coating is especially preferred for the production of a coated linear polyester film substrate, such as a coated polyethylene terephthalate film, which is preferably firstly stretched in the longitudinal direction over a series of rotating rollers, coated, and then stretched transversely in a stenter oven, preferably followed by heat setting.

The backing layer composition may be applied to the polymeric film as an aqueous dispersion or solution in an organic solvent by any suitable conventional coating technique such as dip coating, bead coating, reverse roller coating or slot coating.

A backing layer composition applied to the polymeric film substrate is preferably applied as an aqueous dispersion. The temperatures applied to the coated film during the subsequent stretching and/or heat setting are effective in drying the aqueous medium, or the solvent in the case of solvent-applied compositions, and also, if required, in coalescing and forming the coating into a continuous and uniform layer. The cross-linking of cross-linkable backing layer compositions is also achieved at such stretching and/or heat-setting temperatures.

In order to produce a continuous coating, the backing layer is preferably applied to the polymeric film at a coat weight within the range 0.to 1 to 10 mgdm$^{-2}$, especially 0.1 to 2.0 mgdm$^{-2}$. Provision of a continuous backing layer can improve the slip properties of the film and the adhesion of a range of subsequently applied coatings, inks and lacquers to the base film. Modification of the surface of the backing layer, e.g. by flame treatment, ion bombardment, electron beam treatment, ultra-violet light treatment or preferably by corona discharge, may improve the adhesion of subsequently applied inks and lacquers, but may not be essential to the provision of satisfactory adhesion.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface.

Satisfactory adhesion of a range of coatings, inks and lacquers applied directly to the surface of the coated layer can however be achieved without any prior surface modification, eg by corona discharge treatment. An example of a backing layer which provides adequate adhesion without corona discharge treatment comprises a terpolymer derived from the following monomers: ethyl acrylate/methyl methacrylate/acrylamide or methacrylamide, conveniently in the approximate molar proportions of 46/46/8 respectively.

Provision of a discontinuous backing layer improves the slip properties of the film. To produce a discontinuous coating, the backing layer is preferably applied to the polymeric film at a coat weight within the range 0.01 to 0.2 mgdm$^{-2}$, especially 0.03 to 0.1 mgdm$^{-2}$. An example of a discontinuous backing layer which provides the film with improved slip properties comprises a terpolymer derived from the following monomers: ethyl acrylate/methyl methacrylate/acrylamide or methacrylamide, conveniently in the approximate molar proportions of 46/46/8 respectively.

At certain coat weights it is possible to produce both continuous and discontinuous coatings, depending upon the particular polymer used, the components present in the coating composition, the method of coating and the drying conditions.

Prior to deposition of the backing layer onto the polyester substrate, the exposed surface thereof may, if desired, be subjected to a chemical or physical surface-modifying treatment to improve the bond between that surface and the subsequently applied backing layer. A preferred treatment, because of its simplicity and effectiveness, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solvent of p-chloro-m-cresol, 2,4-dichlorophenol, 2,4,5- or 2,4 6-trichlorophenol or 4-chlororesorcinol in acetone or methanol.

The ratio of base to backing layer thickness may vary within a wide range, although the thickness of the backing layer preferably should not be less than 0.001% nor greater than 10% of that of the base. In practice, for a continuous coat, the thickness of the backing layer is desirably at least 0.01 $\mu$m and preferably should not greatly exceed about 1.0 $\mu$m. For a discontinuous coat, the thickness of the backing layer is preferably less than 0.01 $\mu$m.

The layers of a multilayer film according to the invention may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilizers, viscosity modifiers and dispersion stabilizers may be incorporated in the substrate, heat-sealable and/or backing layer(s), as appropriate. The additives must not increase the overall haze (measured as hereinbefore described) of the multilayer film above 3.5%, and preferably not above 1.5%. The backing layer may comprise a particulate filler, such as silica, of small particle size. Desirably, a filler, if employed in a backing layer, should be present in an amount of not exceeding 50% by weight of polymeric material, and the particle size thereof should not exceed 0.5 $\mu$m, preferably less than 0.3 $\mu$m, and especially from 0.005 to 0.2 $\mu$m. The backing layer preferably contains no fillers.

The multilayer film of the present invention may, if desired, comprise a release layer preferably adhered to the heat-sealable layer. The release layer preferably comprises a polyurethane abherent resin, particularly a polyurethane resin comprising the reaction product of:
  (i) an organic polyisocyanate,
  (ii) an isocyanate-reactive polydialkylsiloxane,and
  (iii) a polymeric polyol.

The organic polyisocyanate component of the polyurethane release medium may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate. 4-4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates may be used and also polyisocyanates which have been modified by the introduction of urethane, allophanate, urea, biuret, carbodiimide, uretonimine or isocyanurate residues.

The isocyanate-reactive polydialkylsiloxane may be mono-functional, but conveniently comprises at least two isocyanate-reactive groups.

Polydialkylsiloxanes in which the alkyl group contains from 1 to 6 carbon atoms, particularly a methyl group, and having at least two isocyanate-reactive groups are known. These include polydimethylsiloxanes having two or more reactive groups selected from hydroxy, mercapto, primary amino, secondary amino and carboxy groups. The polydialkylsiloxane may be linear, for example a diol having a hydroxy group at each end, or it may be branched, having three or more isocyanate-reactive groups which may be situated at the various ends of the molecule or may all be located at one end.

Examples of suitable polydimethylsiloxanes include diols of the formula:

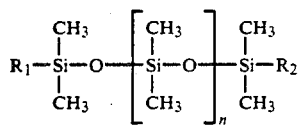

wherein:
n is an integer from 0 to 100, preferably from 1 to 50, and more preferably from 10 to 20, and
$R_1$ and $R_2$ which may be the same or different, are

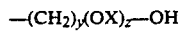

wherein:
X is —CH$_2$—CH$_2$— and/or

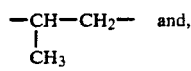

y is an integer of from 2 to 12, preferably 2 to 4, and more preferably 3, and
z is an integer of from 0 to 25, preferably 5 to 15, and more preferably 11 or 12, and
triols of the formula:

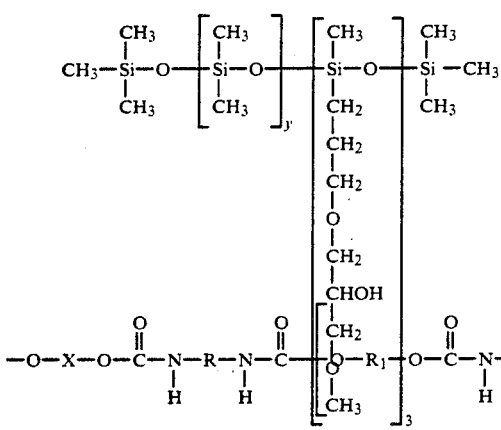

wherein y is an integer from 40 to 150, particularly from 50 to 75.

The polymeric polyol component of the release medium may be a member of any of the chemical classes of polymeric polyols used or proposed to be used in polyurethane formulations. For example, the polymeric polyol may be a polyester, polyesteramide, polyether, polythioether, polyacetal or polyolefin, but preferably a polycarbonate - which has a relatively high glass transition temperature (Tg≈140° C.) and confers desirable hardness to the release medium.

Polycarbonates are essentially thermoplastics polyesters of carbonic acid with aliphatic or aromatic dihydroxy compounds and may be represented by the general structural formula:

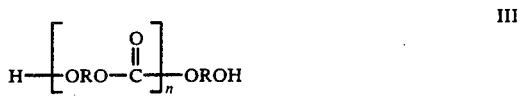

wherein R is a divalent aliphatic or aromatic radical and n is an integer of from 2 to 20. They may be be prepared by conventional procedures, such as transesterification of a diester of carbonic acid with an aliphatic or aromatic dihydroxy compound or with mixed aliphatic or aromatic dihydroxy compounds. Typical reactants may comprise 2,2-(4,4'-dihydroxydiphenyl)-propane, commonly known as bisphenol A, 1,1-isopropylidene-bis-(p-phenyleneoxy-2-ethanol), commonly known as ethoxylated bisphenol A, or 1,4- yclohexanedimethanol.

Preferably, the molecular weight of the polymeric polyol is from 700 to 3000.

If desired, the polyurethane release medium may also comprise one or more compounds containing a plurality of isocyanate-reactive groups. A suitable additional isocyanate-reactive compound comprises an organic polyol, particularly a short chain aliphatic diol or triol, or mixture thereof, having a molecular weight in the range 62 to 6000 and being free from silicon atoms.

An organic diamine, particularly an aliphatic diamine, may also be included either independently or together with the organic polyol.

A typical release medium in accordance with the invention thus comprises a urethane-silicone polymer including a structure of formula IV:

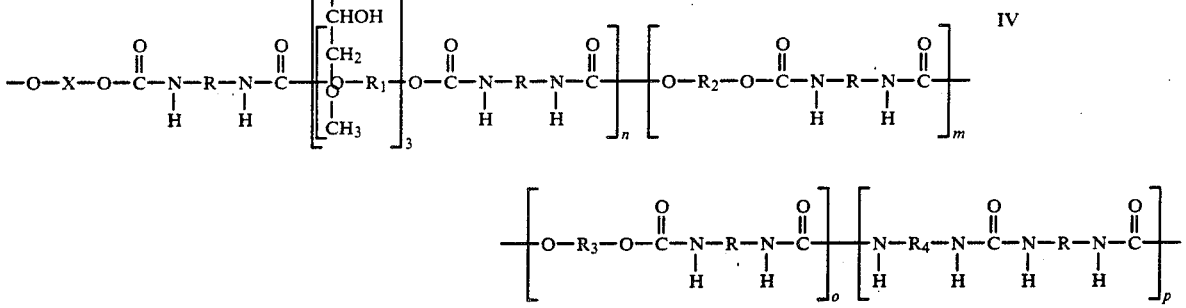

wherein:
R=a divalent aliphatic and/or cyclodiphatic or aromatic hydrocarbon radical;
X=$R_1$ or $R_2$,
$R_1$=a polycarbonate, polyester or polyether group,
$R_2$=a silicone chain of molecular weight from 500 to 3000,
$R_3$=divalent aliphatic and/or cycloaliphatic hydrocarbon radical,
$R_4$=divalent aliphatic hydrocarbon radical, optionally containing a carboxyl group,
n and m are integers of from 1 to 20,
o and p are integers of from 0 to 20.

If desired, a catalyst for urethane formation, such as dibutyltin dilaurate and/or stannous octoate may be used to assist formation of the release medium, and a non-reactive solvent may be added before or after formation of the medium to control viscosity. Suitable non-reactive solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone. Other suitable solvents include vinyl monomers which are subsequently polymerised.

The polyurethane resins of the invention are water dispersible, and a release medium comprising an aqueous polyurethane dispersion may be prepared by dispersing the water dispersible, polyurethane resin in an aqueous medium, preferably in the presence of an effective amount of a polyfunctional active hydrogen-containing chain extender.

The resin may be dispersed in water using techniques well known in the art. Preferably, the resin is added to the water with agitation or, alternatively, water may be stirred into the resin.

The polyfunctional active hydrogen-containing chain extender, if employed, is preferably water-soluble, and water itself may be effective. Other suitable extenders include a polyol, an amino alcohol, ammonia, a primary or secondary aliphatic, alicyclic, aromatic, araliphatic or heterocyclic amine especially a diamine, hydrazine or a substituted hydrazine.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'-methylenebis(2-chloroaniline), 3,3'-dichloro-4,4'bi-phenyl diamine, 2,6'-diaminopyridine, 4,4'-diaminodiphenylmethane, menthane diamine, m-xylene diamine, isophorone diamine, and adducts of diethylene triamine with acrylate or its hydrolysed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazines such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of polyurethane resin or, alternatively, it may already be present in the aqueous medium when the resin is dispersed therein.

Desirably, the polyfunctional chain extender should be capable of intra-molecular cross-linking, to improve durability and resistance to solvents. Suitable resinous intra-molecular cross-linking agents comprise epoxy resins, alkyd resins and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde, e.g. formaldehyde. A useful condensation product is that of melamine with formaldehyde. The condensation product may optionally be partially or totally alkoxylated, the alkoxy group preferably being of low molecular weight, such as methoxy, ethoxy, n-butoxy or iso-butoxy. A hexamethoxymethyl melamine condensate is particularly suitable. Another particularly suitable cross-linking agent is a polyaziridine.

Such polyfunctional extenders preferably exhibit at least trifunctionality (ie three functional groups) to promote inter-molecular cross-linking with the functional groups present in the polyurethane resin and improve adhesion of the release medium layer to the receiving layer.

In a preferred embodiment of the invention the release medium comprises a chain extender and a cross-linking agent.

The chain extension may be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the resin, the ratio of active hydrogens in the chain extender to NCO groups in the resin preferably being in the range from 1.0 to 2.0:1.

A catalyst is preferably introduced into the release medium to accelerate the intra-molecular cross-linking action of the resinous cross-linking agent and also to accelerate its inter-molecular cross-linking action with cross-linkable functional groups in the polyurethane resin. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilized by reaction with a base, ammonium para toluene sulphonate and morpholinium para toluene sulphonate.

If desired, the release msdium may additionally comprise a surfactant to promote spreading thereof when applied to a film substrate.

The release medium may be applied to an already oriented film substrate. However, application of the release medium is preferably effected before or during the stretching operation. In particular, it is preferred that the release layer medium should be applied to the polymeric film between the two stages (longitudinal and transverse) of a biaxial stretching operation. Such a sequence of stretching and coating is especially preferred for the production of a coated linear polyester, such as a polyethylene terephthalate, film substrate/polyester heat-sealable layer film, which is preferably firstly stretched in the longitudinal direction over a series of rotating rollers, coated, and then stretched transversely in a stenter oven, preferably followed by heat setting.

The release layer composition may be applied to the polymeric film as an aqueous dispersion or solution in an organic solvent by any suitable conventional coating technique such as dip coating, bead coating, reverse roller coating or slot coating.

A release layer composition applied to the polymeric film is preferably applied as an aqueous dispersion. The temperatures applied to the coated film during the subsequent stretching and/or heat setting are effective in drying the aqueous medium, or the solvent in the case of solvent-applied compositions, and also, in coalescing and forming the coating into a continuous and uniform layer. The cross-linking of cross-linkable release layer compositions is also achieved at such stretching and/or heat-setting temperatures.

The invention is illustrated by reference to the accompanying drawings in which.

Figure 1:
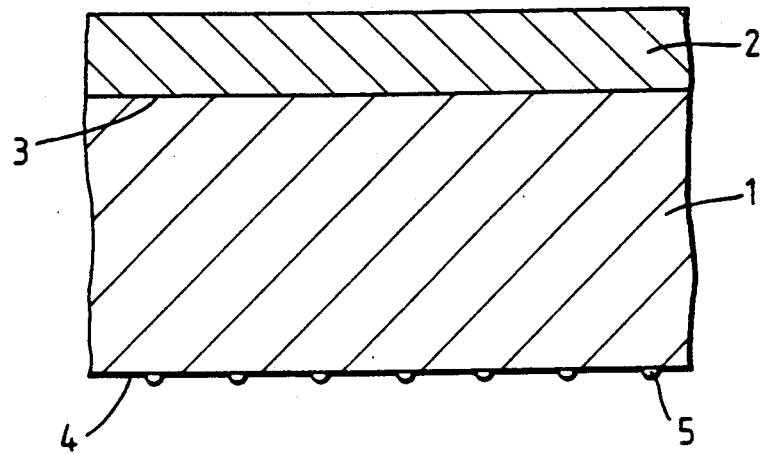
FIG. 1 is a schematic sectional elevation, not to scale, of a polymer film having both a heat-sealable layer and a discontinuous backing layer adhered directly to opposite sides of the substrate.
Figure 2:
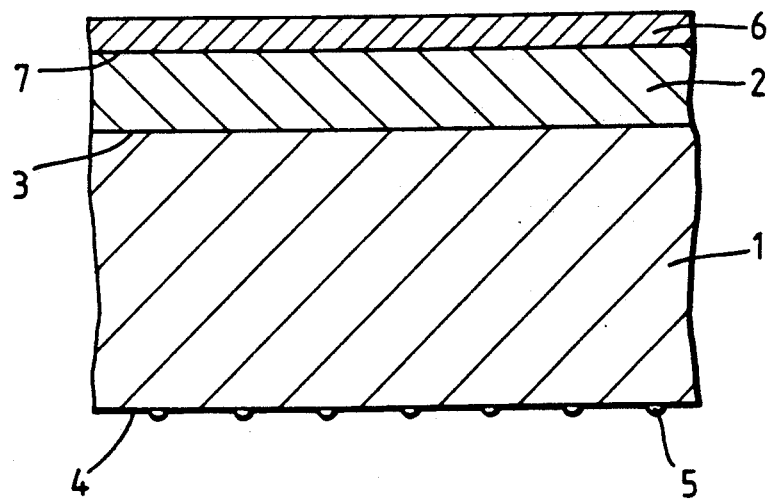
FIG. 2 is a similar schematic elevation of a polymer film with an additional release layer adhered to the heat-sealable layer.

Referring to FIG. 1 of the drawings, the film comprises a polymer substrate layer (1) having a heat-sealable layer (2) bonded to one surface (3) thereof, and a discontinuous backing layer (5) bonded to the second substrate surface (4).

The film of FIG. 3 further comprises an additional layer, a release layer (6), bonded to the remote surface (7) of the heat-sealable layer (2).

The invention is further illustrated by reference to the following Examples.

EXAMPLE 1

Separate streams of a first substrate polymer of polyethylene terephthalate, and a second polymer comprising a copolyester of 82 mole % ethylene terephthalate and 18 mole % of ethylene isophthalate were supplied from separate extruders to a single channel coextrusion assembly, and extruded through a film-forming die onto a water cooled rotating, quenching drum to yield an amorphous cast composite extrudate. The cast extrudate was heated to a temperature of about 80° C. and then stretched longitudinally at a forward draw ratio of 3.2:1. The stretched film was then coated with a backing layer on the bare polyethylene terephthalate substrate surface with an aqueous composition containing the following ingredients:

Acrylic resin: 5 ml
(46% w/w aqueous latex of methyl methacrylate/ethyl acrylate/methacrylamide: 46/46/8 mole %, with 25% by weight methoxylated melamine-formaldehyde)
Ammonium nitrate: 0.05 ml
(10% w/w aqueous solution)
Synperonic N: 5 ml
(27% w/w aqueous solution of a nonyl phenol ethoxylate, supplied by ICI)
Demineralised water: to 1 liter The multilayer film was passed into a stenter oven, where the film was dried and stretched in the sideways direction to approximately 3.4 times its original dimensions. The biaxially stretched film was heat set at a temperature of about 225° C. Final film thickness was 75 μm, the copolyester layer being 11 μm thick, and the discontinuous backing layer having a dry coat thickness of less than 0.007 μm, and dry coat weight of approximately 0.05 mgdm$^{-2}$.

The heat-seal strength of the film was measured by sealing the copolyester layer to itself or to an uncoated polyethylene terephthalate film, at 140° C. for 2 seconds under a pressure of 1 Kgcm$^{-2}$, cooling to room temperature, and measuring the force required under linear tension per unit width of seal to peel the sealed films apart at a constant speed of 5.08 mms$^{-1}$. In addition, the heat-seal strength of the backing layer to both the copolyester layer and to uncoated polyethylene terephthalate was determined. The results are given in Table 1.

The static coefficient of friction of the backing layer was measured against uncoated polethylene terephthalate and against the copolyester layer by the procedure of ASTM test D1894. In addition, the coefficient of friction of the copolyester layer was measured against itself, and against uncoated polyethylene terephthalate. The results are given in Table 1.

Optical clarity of the film was determined by measuring the haze and total luminous transmission (TLT) using the standard test ASTM D1003. The haze was 0.3%, and TLT 91.1%.

EXAMPLE 2

The procedure of Example 1 was repeated except that the volume of acrylic resin added to the coating composition was increased to 30 ml, and the volume of ammonium nitrate added was increased to 0.15 ml, in order to form a continuous backing layer. The dry coat thickness of the backing layer was 0.025 μm, and the dry coat weight was approximately 0.3 mgdm$^{-2}$. The heat-seal strength, and static coefficient of friction of the continuous backing layer was measured against uncoated polyethylene terephthalate and against the copolyester layer by the procedure of ASTM test D1894. The results are given in Table 1.

EXAMPLE 3

The procedure of Example 1 was repeated except that no copolyester layer was coextruded with the polyethylene terephthalate layer, and no backing layer was coated thereon. The heat-seal strength and static coefficient of friction of the polyethylene terephthalate film was measured against itself, as described in Example 1. The results are given in Table 1.

TABLE 1

| Example No. | | | Heat-Seal Strength g/25 mm (Nm$^{-1}$) | Static Coefficient of Friction |
|---|---|---|---|---|
| 1 | Copolyester | Copolyester | 1940 (761.5) | >1.95 |
| | Copolyester | Polyethylene Terephthalate | 165 (64.8) | >1.95 |
| | Backing Layer | Copolyester | No Heat-Seal | 0.39 |
| | Backing Layer | Polyethylene Terephthalate | " | 0.36 |
| 2 | Backing Layer | Copolyester | " | 0.50 |
| | Backing Layer | Polyethylene Terephthalate | " | 0.45 |
| 3 (Comparative) | Polyethylene Terephthalate | Polyethylene Terephthalate | " | >1.95 |

The results in Table 1 illustrate the improved heat-seal properties and slip-providing properties of multilayer films of the present invention.

EXAMPLE 4

The film produced in Example 1 was additionally coated on top of the copolyester layer with an abherent coating medium containing the following ingredients:

Permuthane UE-41222: 0.125 Kg
(Polycarbonate-silicone-urethane resin supplied by Permuthane Coatings, Massachusetts, U.S.A.)
Synperonic OP 10: 0.050 kg
(Alkyl ethoxylated surfactant supplied by ICI)
Distilled water: 2.325 Kg The aqueous abherent medium was applied to the copolyester layer by a roller coating technique, at the same stage in the film making process as the backing layer was applied ie between the foreward draw and sideways draw. The film was subsequently heated in an oven up to 225° C. to dry and cure the coating. The resultant release film comprised an abherent layer of about 0.1 μm thickness.

The release film was heat sealed by uniform pressure (40 psi) at room temperature for 2.0 seconds to Sellotape adhesive tape. Each sample had a sealed area of 25 mm by 25 mm, with an unsealed tail at least 100 mm long. The degree of release was measured by peeling apart each specimen using an Instron A0533 Tensometer at a peel speed of 100 mm min$^{-1}$. The release film had a peak peel strength of 0.370 g/25 mm (0.145 Nm$^{-1}$) and a mean peel strength of 0.079 g/25 mm (0.031 Nm$^{-1}$).

EXAMPLE 5

This is a comparative Example not according to the invention.

The procedure of Example 4 was repeated except that uncoated polyethylene terephthalate film (ie no copolyester, backing or abherent layer) was used in the peel strength tests. The uncoated polyethylene terephthalate film had a peak peel strength of 1.545 g/25 mm (0.606 Nm$^{-1}$) and a mean peel strength of 1.345 g/25 mm (0.528 Nm$^{-1}$).

The results obtained in Examples 4 and 5 illustrate that the abherent coating layer provides good release properties.

What we claim is:

1. A multilayer film comprising a substrate layer of polymeric material having on a first surface thereof a polyester heat-sealable layer, and on a second surface thereof a backing layer, characterised in that the backing layer comprises a thermoset acrylic resin.

2. A film according to claim 1 wherein the heat-sealable layer comprises a linear copolyester.

3. A film according to claim 2 wherein the copolyester comprises a copolyester of ethylene terephthalate and ethylene isophthalate.

4. A film according to any one of the preceding claims wherein the acrylic resin comprises a terpolymer of methyl methacrylate/ethyl acrylate/acrylamide or methacrylamide.

5. A film according to any one of the preceding claims wherein the backing layer is a discontinuous coating.

6. A film according to any one of the preceding claims wherein the film additionally comprises a release layer.

7. A film according to claim 6 wherein the release layer comprises a polyurethane resin.

8. A film according to claim 7 wherein the polyurethane resin comprises the reaction product of:
   (i) an organic polyisocyanate,
   (ii) an isocyanate-reactive polydialkylsiloxane, and
   (iii) a polymeric polyol.

9. A film as claimed in any one of the preceding claims wherein the substrate comprises a biaxially oriented film of polyethylene terephthalate.

10. A method of producing a multilayer film by forming a substrate layer of polyester material, applying to a first surface thereof a polyester heat-sealable layer, and applying to a second surface thereof a polymeric backing layer, characterised in that the backing layer comprises a thermosetting acrylic resin.

* * * * *